US009967122B2

(12) United States Patent
Park et al.

(10) Patent No.: US 9,967,122 B2
(45) Date of Patent: May 8, 2018

(54) TECHNIQUES FOR EXTENDING AN OFDM WAVEFORM FOR MULTIPLEXING

(71) Applicant: QUALCOMM Incorporated, San Diego, CA (US)

(72) Inventors: Seyong Park, San Diego, CA (US); Wei Zeng, San Diego, CA (US); Joseph Binamira Soriaga, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 85 days.

(21) Appl. No.: 15/271,825

(22) Filed: Sep. 21, 2016

(65) Prior Publication Data

US 2017/0207941 A1    Jul. 20, 2017

Related U.S. Application Data

(60) Provisional application No. 62/280,592, filed on Jan. 19, 2016.

(51) Int. Cl.
*H04L 27/26* (2006.01)

(52) U.S. Cl.
CPC ...... *H04L 27/2605* (2013.01); *H04L 27/2602* (2013.01); *H04L 27/265* (2013.01); *H04L 27/2628* (2013.01); *H04L 27/2636* (2013.01)

(58) Field of Classification Search
CPC  H04L 27/265; H04L 27/2605; H04L 27/2628
See application file for complete search history.

(56) References Cited

U.S. PATENT DOCUMENTS 5,394,473 A * 2/1995 Davidson ............ G10L 19/0212
                                                           375/240
7,002,900 B2    2/2006 Walton et al.
(Continued)

FOREIGN PATENT DOCUMENTS

WO    WO-2015/113594 A1    8/2015

OTHER PUBLICATIONS

Gilberto B., et al., "Zero-Tail DFT-Spread-OFDM Signals", 2013 IEEE Globecom Workshops (GC Wkshps), IEEE, Dec. 9, 2013 (Dec. 9, 2013), XP032600025, pp. 229-234.
(Continued)

*Primary Examiner* — Khaled Kassim
*Assistant Examiner* — Syed S Ali
(74) *Attorney, Agent, or Firm* — Arent Fox, LLP

(57) ABSTRACT

Aspects of the present disclosure provide systems, methods, and apparatuses for implementing the multiplexing of different orthogonal frequency-division multiplexing (OFDM) waveforms using a transmitter and receiver configured to process different types of signals without a need for distinct hardware structures. In one example, aspects of the present disclosure may include a transmitter configured to transmit both a first type of discrete fourier transform (DFT)-spread OFDM waveform and a second type of DFT-spread OFDM waveform that may be multiplexed over the wireless channel. In some aspects, the transmitter may modify the numerology of the zero-tail DFT-spread OFDM waveform to match the numerology of other OFDM waveforms (e.g., OFDM waveform with zero-guard or a single carrier DFT-spread OFDM with zero-guard).

12 Claims, 11 Drawing Sheets

(56) References Cited

U.S. PATENT DOCUMENTS

| | | | |
|---|---|---|---|
| 2005/0099939 A1 | 5/2005 | Huh et al. | |
| 2006/0268671 A1* | 11/2006 | Coon | H04L 5/0051 370/203 |
| 2008/0108310 A1* | 5/2008 | Tong | H04B 7/0617 455/69 |
| 2011/0058619 A1* | 3/2011 | Arviv | H04B 7/0413 375/267 |
| 2012/0275539 A1* | 11/2012 | Maltsev | H04L 1/0071 375/295 |
| 2015/0365975 A1 | 12/2015 | Sahlin et al. | |
| 2016/0099824 A1 | 4/2016 | Lorca Hernando | |
| 2016/0134339 A1* | 5/2016 | Tong | H04B 7/0617 375/267 |
| 2016/0352419 A1* | 12/2016 | Fonseka | H04B 10/0793 |
| 2017/0034829 A1* | 2/2017 | Yang | H04W 72/0486 |
| 2017/0222702 A1* | 8/2017 | Tong | H04B 7/0456 |

OTHER PUBLICATIONS

International Search Report and Written Opinion issued in International Patent Application No. PCT/US2017/013430, dated Apr. 11, 2017 (15 pages).

Nelli G-B., et al., On the Potential of OFDM Enhancements as 5G Wavforms, 2014 IEEE 79th Vehicular Technology Conference (VTC 2014-Spring), Seoul, Korea, May 18-21, 2014, May 1, 2014 (May 1, 2014), XP055310389, pp. 1-5.

\* cited by examiner

TECHNIQUES FOR EXTENDING AN OFDM WAVEFORM FOR MULTIPLEXING

CROSS-REFERENCE TO RELATED APPLICATION(S)

This application claims the benefit of U.S. Provisional Application Ser. No. 62/280,592, entitled "TECHNIQUES FOR EXTENDING AN OFDM WAVEFORM FOR MULTIPLEXING" and filed on Jan. 19, 2016, which is expressly incorporated by reference herein in its entirety.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., an LTE system).

By way of example, a wireless multiple-access communications system may include a number of base stations, each simultaneously supporting communication for multiple communication devices, which may be otherwise known as user equipment (UEs), mobile devices or stations (STAs). A base station may communicate with the communication devices on downlink channels (e.g., for transmissions from a base station to a UE) and uplink channels (e.g., for transmissions from a UE to a base station).

Recently, the number and types of mobile devices used in cellular networks has grown exponentially. As demand for mobile devices grows, newer techniques, including new types of waveforms, are being proposed for transmitting signals and data over the wireless channel. However, implementing these different techniques in a hybrid network may be costly due to each system requiring hardware with unique or dedicated functionality for each technique (e.g., transmitter and receiver) to process and decode the various signals and data.

SUMMARY

Aspects of the present disclosure provide systems, methods, and apparatuses for implementing the multiplexing of different orthogonal frequency-division multiplexing (OFDM) waveforms using a transmitter and receiver configured to process different types of signals without a need for distinct hardware structures. In one example, aspects of the present disclosure may include a transmitter (e.g., UE or base station) configured to transmit both a first type of discrete fourier transform (DFT)-spread orthogonal frequency-division multiplexing (OFDM) waveform and a second type of DFT-spread OFDM waveform that may be multiplexed over the wireless channel. In order to process and transmit each of the different types of waveforms, the transmitter may be configured to scale a first type of DFT-spread OFDM waveform to increase a number of tail zero bits attached to a data sequence, and truncate the increased number of tail zero bits in the first type DFT-spread such that a size of the first type of DFT-spread OFDM waveform matches a size of a second type of DFT-spread OFDM waveform. Accordingly, the transmitter may transmit the first type of DFT-spread OFDM waveform having the increased number of tail zero bits truncated to a receiver over a wireless channel.

Conversely, aspects of the present disclosure may also include a shared receiver configured to process and decode both the first type of DFT-spread OFDM waveform and the second type of DFT-spread OFDM waveform. In some aspects, the receiver (e.g., UE or base station) may receive a multiplexed signal that comprises both the first type of DFT-spread OFDM waveform and the second type of DFT-spread OFDM waveform. The receiver may decode the multiplexed signal to extract the data sequence from the multiplexed signal by identifying corresponding symbol tones for the first type of discrete DFT-spread OFDM waveform or the second type of DFT-spread OFDM waveform.

In one aspect, a method of wireless communications is disclosed. The method may comprise scaling a first type of DFT-spread OFDM waveform to increase a number of tail zero bits attached to a data sequence. The method may further include truncating the increased number of tail zero bits in the first type DFT-spread such that a size of the first type of DFT-spread OFDM waveform matches a size of a second type of DFT-spread OFDM waveform and transmitting the first type of DFT-spread OFDM waveform having the increased number of tail zero bits truncated.

In yet another aspect, an apparatus for wireless communications is disclosed. The apparatus may comprise a transceiver, a memory configured to store instructions, and a processor communicatively coupled to the transceiver and the memory. In some examples, the processor may be configured to execute the instructions to scale a first type of DFT-spread OFDM waveform to increase a number of tail zero bits attached to a data sequence and truncate the increased number of tail zero bits in the first type DFT-spread such that a size of the first type of DFT-spread OFDM waveform matches a size of a second type of DFT-spread OFDM waveform. The processor may be further configured to execute the instructions to transmit the first type of DFT-spread OFDM waveform having the increased number of tail zero bits truncated.

In another aspect, an apparatus for wireless communications is disclosed. The apparatus may comprise means for scaling a first type of DFT-spread OFDM waveform to increase a number of tail zero bits attached to a data sequence. The apparatus may further include means for truncating the increased number of tail zero bits in the first type DFT-spread such that a size of the first type of DFT-spread OFDM waveform matches a size of a second type of DFT-spread OFDM waveform, and means for transmitting the first type of DFT-spread OFDM waveform having the increased number of tail zero bits truncated.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Figure 1A:
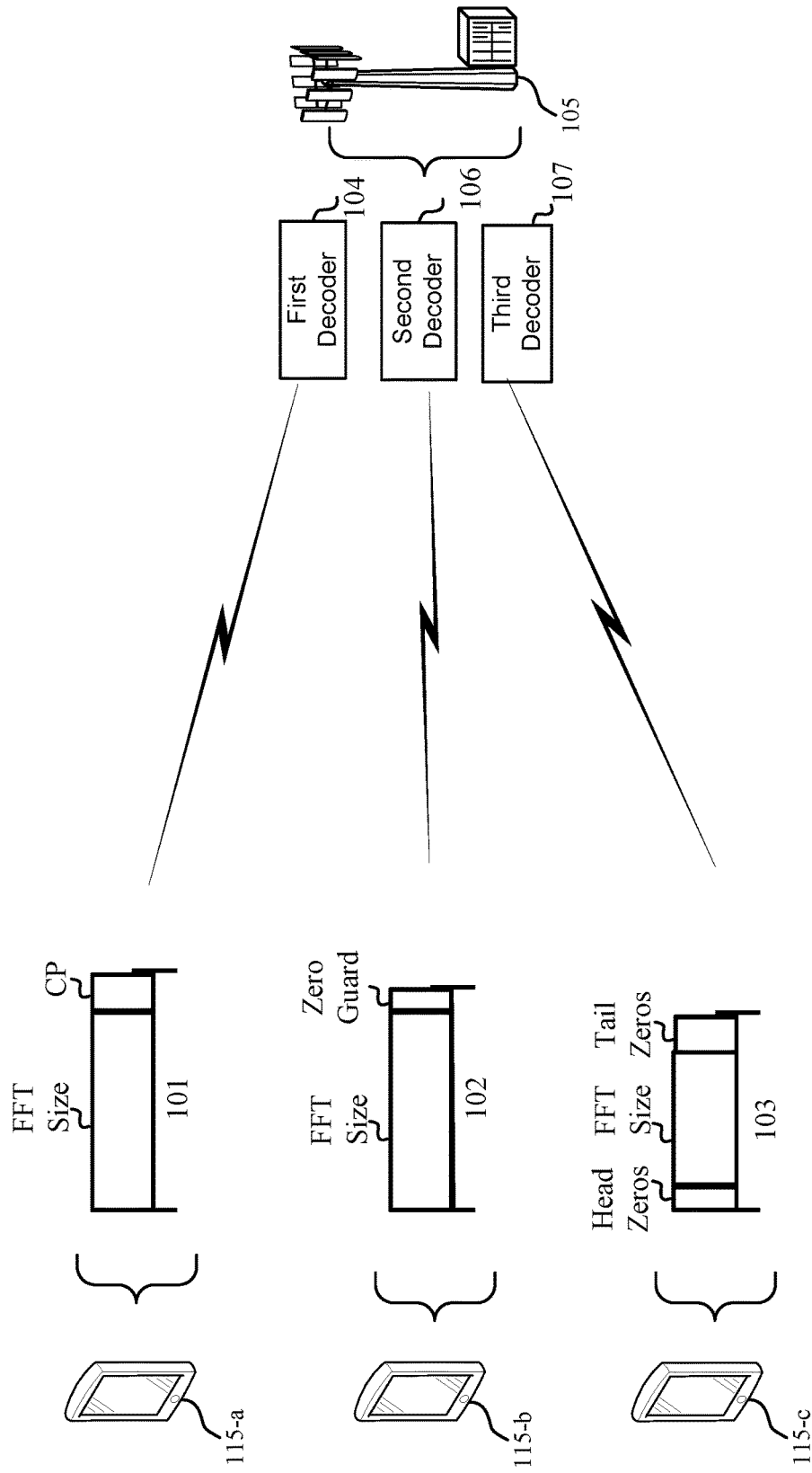
FIGS. 1A and 1B illustrate a problem with existing systems that aspects of the present disclosure solve.
Figure 1B:
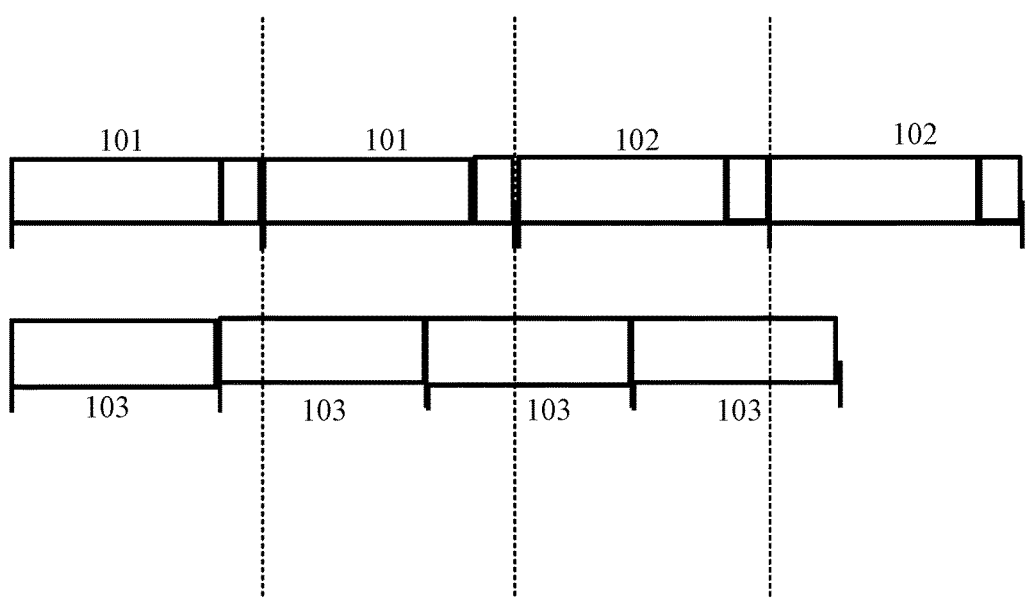

As discussed above, and with reference to FIG. 1A, a transmitting device (e.g., one or more UEs 115) may utilize various techniques (e.g., new types of waveforms) for transmitting data over a wireless channel. For example, a first UE 115-a may utilize a first type of OFDM waveform, such as a DFT-spread OFDM with Cyclic Prefix (CP) waveform 101, having a first symbol length (e.g., fast fourier transform (FFT) size+CP length). Additionally or alternatively, a second UE 115-b may utilize a different type of OFDM waveform, such as a DFT-spread OFDM with zero-guard waveform 102, having a second symbol length (e.g., FFT size+ zero guard). Even further, a third UE 115-c may utilize a third type of OFDM waveform, such as a zero-tail DFT spread OFDM waveform 103, having a third type symbol length (e.g., head zeros+FFT size+tail zeros). In some aspects, each waveform may exhibit dissimilar characteristics and each of the first, second and third symbol lengths may be different. The dissimilar characteristics of each of the waveforms and varying symbol lengths may result in the waveforms having different numerology, and thus causing misalignment of the waveforms over the wireless channel (see FIG. 1B).

Accordingly, processing and decoding each of the above-identified waveforms may be difficult for a receiver (e.g., base station 105). In some aspects, a receiver may require dedicated hardware (e.g., first decoder 104, second decoder 106, and third decoder 107) for decoding the different waveform type(s), making both the transmitter and the receiver more complex and costly.

Aspects of the present disclosure resolve the above-identified issues by modifying the numerology of the zero-tail DFT spread OFDM waveform 103 to match the numerology of other OFDM waveforms (e.g., OFDM waveform with zero-guard or a single carrier DFT-spread OFDM with zero-guard). In doing so, an extended zero-tail DFT-spread OFDM waveform is generated by scaling the DFT-spread OFDM waveform to increase a number of tail zero bits attached to a data sequence, and subsequently truncating the increased number of tail zero bits in the first type DFT-spread such that a size of the first type of DFT-spread OFDM waveform matches a size of a second type of DFT-spread OFDM waveform. The term "scaling" may refer to increasing the number of bits of the conventional DFT-spread OFDM waveform, while the term "truncating" may refer to reducing the number of bits of the signal. As such, aspects of the present disclosure allow each of the first type of DFT-spread OFDM waveform and the second type of DFT-spread OFDM waveform to be multiplexed and decoded using a shared decoder without the need for costly hardware upgrades that process each waveform separately.

Figure 2:
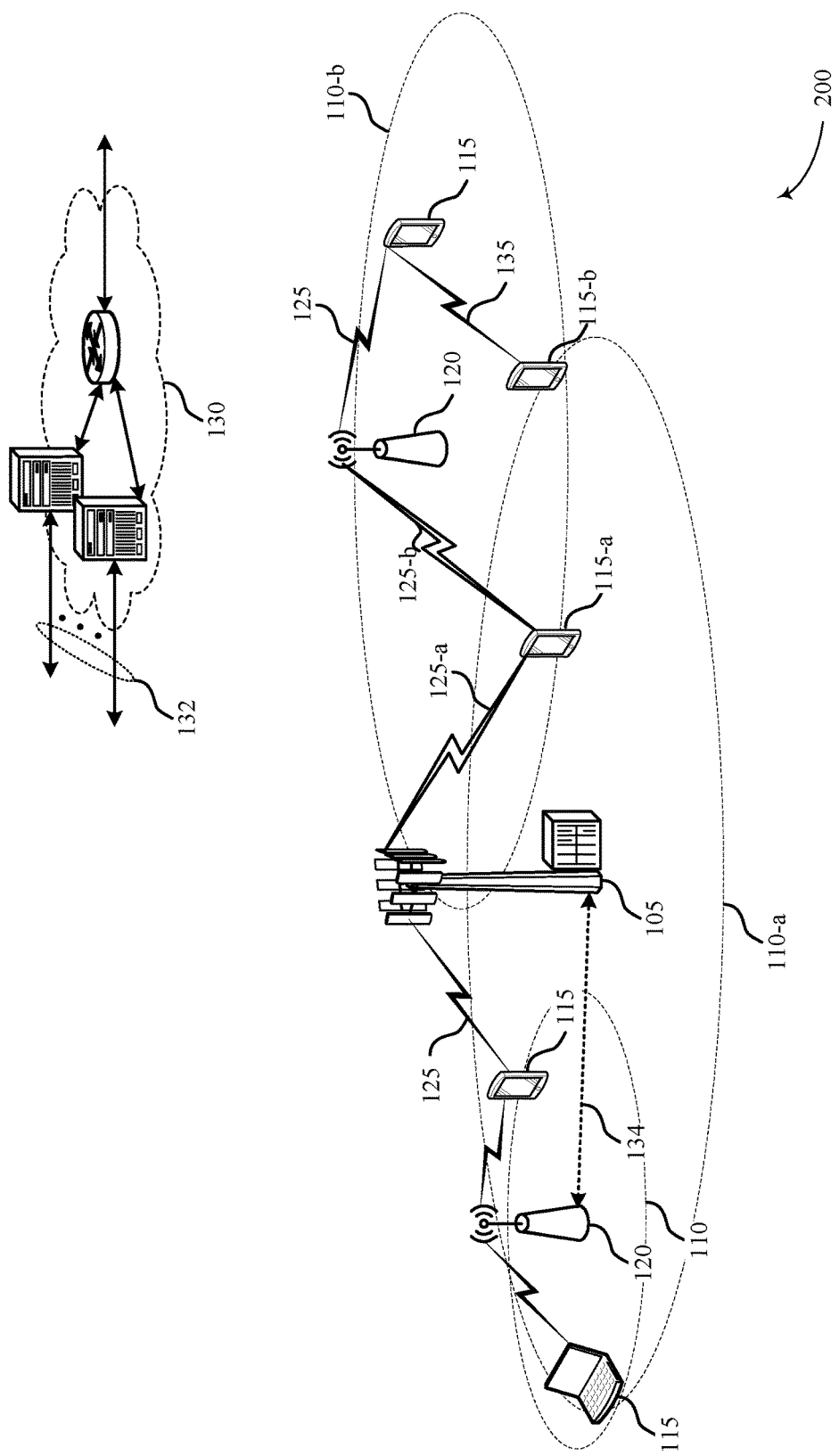
FIG. 2 illustrates an example of a wireless communications system in accordance with various aspects of the present disclosure.

FIG. 2 illustrates an example of a wireless communications system 200 in accordance with various aspects of the present disclosure. The wireless communications system 200 includes base stations 105, access points (AP) 120, mobile devices 115, and a core network 130. In some aspects of the present disclosure, the base station 105 may be referred to as a macro cell base station, and AP 120 may be referred to as small cell base station. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 and AP 120 may perform radio configuration and scheduling for communication with the mobile devices 115, or may operate under the control of a base station controller (not shown). In various examples, the base station 105 and AP 120 may communicate, either directly or indirectly (e.g., through core network 130), with each other over backhaul links 134 (e.g., X2, Over-the-air (OTA) etc.), which may be wired or wireless communication links. The system 200 may be configured to support multiplexing of two or more types of OFDM waveforms. For example, when one type of mobile device 115 supports a first type of waveform and another type of mobile device 115 supports a second type of waveform, it is possible to multiplex these different types of waveforms when transmitted to a base station 105 or an AP 120. In one example, a first mobile device 115 may transmit signals using an extended zero-tail DFT-spread OFDM waveform and a second mobile device 115 may transmit signals using a DFT-spread OFDM with cyclic prefix or a DFT-spread OFDM with zero-guard, where the signals are transmitted to a base station 105 or an AP 120 such that the waveforms are multiplexed.

The base station 105 and AP 120 may wirelessly communicate with the mobile device 115 via one or more antennas. Each of the base station 105 and AP 120 may provide communication coverage for a respective geographic coverage area 110. In some examples, base station 105 may be referred to as a base transceiver station, a radio base station, an access point, a radio transceiver, a NodeB, eNodeB (eNB), Home NodeB, a Home eNodeB, or some other suitable terminology. The geographic coverage area 110-*a* for a base station 105 and coverage area 110-*b* for AP 120 may be divided into sectors making up only a portion of the coverage area (not shown). The wireless communications system 200 may include base station 105 and AP 120 of different types (e.g., macro or small cell base stations). There may be overlapping geographic coverage areas 110 for different technologies.

While the mobile devices 115 may communicate with each other through the base station 105 and AP 120 using communication links 125, each mobile device 115 may also communicate directly with one or more other mobile devices 115 via a direct wireless link 135. Two or more mobile devices 115 may communicate via a direct wireless link 135 when both mobile devices 115 are in the geographic coverage area 110 or when one or neither mobile device 115 is within the AP geographic coverage area 110. Examples of direct wireless links 135 may include Wi-Fi Direct connections, connections established using a Wi-Fi Tunneled Direct Link Setup (TDLS) link, and other P2P group connections. In other implementations, other peer-to-peer connections or ad hoc networks may be implemented within the system 200.

In some examples, the wireless communications system 200 includes a wireless wide area network (WWAN) such as an LTE/LTE-Advanced (LTE-A) network. In LTE/LTE-A networks, the term evolved node B (eNB) may be generally used to describe the base stations 105, while the term user equipment (UEs) may be generally used to describe the mobile devices 115. The wireless communications system 200 may include a heterogeneous LTE/LTE-A network in which different types of eNBs provide coverage for various geographical regions. The wireless communications system 200 may, in some examples, also support a wireless local area network (WLAN). A WLAN may be a network employing techniques based on the Institute of Electrical and Electronics Engineers (IEEE) 802.11 family of standards ("Wi-Fi"). In some examples, each eNB or base station 105 and AP 120 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by mobile device 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by mobile device 115 with service subscriptions with the network provider. A femto cell may also cover a small geographic area (e.g., a home) and may provide restricted access by mobile device 115 having an association with the femto cell (e.g., mobile device 115 in a closed subscriber group (CSG), mobile device 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 200 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a mobile device 115 and the base stations 105. The RRC protocol layer may also be used for core network 130 support of radio bearers for the user plane data. At the physical (PHY) layer, the transport channels may be mapped to physical channels.

The mobile devices 115 may be dispersed throughout the wireless communications system 200, and each mobile device 115 may be stationary or mobile. A mobile device 115 may also include or be referred to by those skilled in the art as a user equipment (UE), mobile station, a subscriber station, STA, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device may be able to communicate with various types of base stations and network equipment including macro eNBs, small cell eNBs, relay base stations, and the like. The mobile devices 115 may be multi-radio devices employing adaptive scanning techniques. For example, a mobile device 115 may dynamically adapt scanning operations of one of its radios based on a signal quality of another of its radios. In some examples, a dual-radio UE 115-*a*, may include a WLAN radio (not shown) and a WWAN radio (not shown) that may be configured to concurrently communicate with base station 105 (using the WWAN radio) and with AP 120 (using the WLAN radio).

The communication links 125 shown in wireless communications system 200 may include uplink (UL) transmissions from a mobile device 115 to a base station 105 or AP 120, or downlink (DL) transmissions, from a base station 105 or AP 120 to a mobile device 115. The downlink transmissions may also be called forward link transmissions while the uplink transmissions may also be called reverse link transmissions. Each of one or more communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The communication links 125 may utilize resources of licensed spectrum or unlicensed spectrum, or both. Broadly speaking, the unlicensed spectrum in some jurisdictions may range from 600 Megahertz (MHz) to 6 Gigahertz (GHz), but need not be limited to that range. As used herein, the term "unlicensed spectrum" or "shared spectrum" may thus refer to industrial, scientific and medical (ISM) radio bands, irrespective of the frequency of those bands. An "unlicensed spectrum" or "shared spectrum" may refer to a spectrum used in a contention-based communications system. In some examples, unlicensed spectrum is the U-MI radio band, which may also be referred to as the 5 GHz or 5G band. By contrast, the term "licensed spectrum" or "cellular spectrum" may be used herein to refer to wireless spectrum utilized by wireless network operators under administrative license from a governing agency.

Wireless communications system 200 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A mobile device 115 may be configured with multiple downlink CCs and one or more uplink CCs for carrier aggregation. Carrier aggregation may be used with both FDD and TDD component carriers.

Data in wireless communications system 200 may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a DL shared channel (DL-SCH) for data transfer, paging channel (PCH) for paging information, and multicast channel (MCH) for multicast transmissions.

Thus, in some examples, in current systems, one or more UEs 115 may utilize various techniques for transmitting data over a wireless channel. For example, a first UE 115-a may utilize a first type of OFDM waveform, such as a DFT-spread OFDM with Cyclic Prefix (CP) waveform, having a first symbol length (e.g., fast fourier transform (FFT) size+ CP length). Additionally or alternatively, a second UE 115-b may utilize a different type of OFDM waveform, such as a DFT-spread OFDM with zero-guard waveform 102, having a second symbol length (e.g., FFT size+zero guard). As noted above, the dissimilar characteristics of each of the waveforms and varying symbol lengths may result in the waveforms having different numerology, and thus causing misalignment of the waveforms over the wireless channel (see FIG. 1B). Further, processing and decoding each of the above-identified waveforms may be difficult for a receiver (e.g., base station 105). In some aspects, a receiver may require dedicated hardware (e.g., first decoder 104, second decoder 106, and third decoder 107) for decoding the different waveform type(s), making both the transmitter and the receiver more complex and costly.

Aspects of the present disclosure resolve the above-identified issues by modifying the numerology of the zero-tail DFT spread OFDM waveform to match the numerology of other OFDM waveforms (e.g., OFDM waveform with zero-guard or a single carrier DFT-spread OFDM with zero-guard). In doing so, an extended zero-tail DFT-spread OFDM waveform is generated by scaling the DFT-spread OFDM waveform to increase a number of tail zero bits attached to a data sequence, and subsequently truncating the increased number of tail zero bits in the first type DFT-spread such that a size of the first type of DFT-spread OFDM waveform matches a size of a second type of DFT-spread OFDM waveform. As such, aspects of the present disclosure allow each of the first type of DFT-spread OFDM waveform and the second type of DFT-spread OFDM waveform to be multiplexed and decoded using a shared decoder without the need for costly hardware upgrades that process each waveform separately.

In accordance with aspects of the present disclosure, the transmitter (e.g., UE 115 or base station 105) may scale a first type of DFT-spread OFDM waveform to increase a number of tail zero bits attached to a data sequence. The method may further include truncating the increased number of tail zero bits in the first type DFT-spread such that a size of the first type of DFT-spread OFDM waveform matches a size of a second type of DFT-spread OFDM waveform and transmitting the first type of DFT-spread OFDM waveform having the increased number of tail zero bits truncated.

Figure 3A:
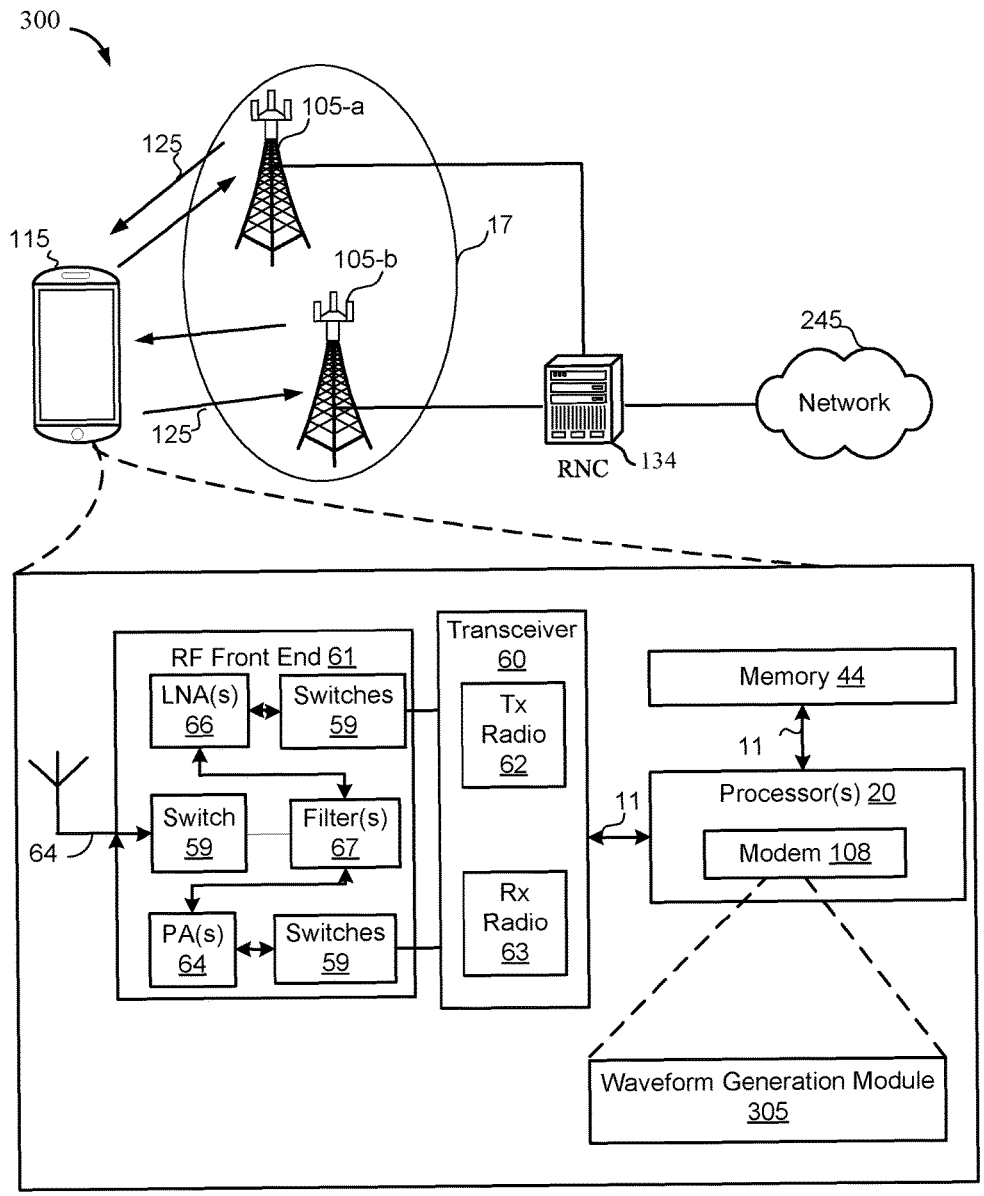
FIG. 3A is a schematic diagram of a user equipment that may implement a transmitter in accordance with various aspects of the present disclosure.

Referring to FIG. 3A, in an aspect, a wireless communication system 300 includes at least one UE 115 in communication coverage of at least one base station 105. In some examples, the UE 115 and/or the base station 105 may be an example of UE 115 and base station 105 described with reference to FIG. 1A and FIG. 2.

In an aspect, the UE 115 may include one or more processors 20 that may operate in combination with waveform generation module 305 operable to generate different types of signals without a need for distinct hardware structures. The one or more processors 20 may include a modem 108 that uses one or more modem processors. The various functions related to the waveform generation module 305 may be included in modem 108 and/or processors 20 and, in an aspect, can be executed by a single processor, while in other aspects, different ones of the functions may be executed by a combination of two or more different processors. For example, in an aspect, the one or more processors 20 may include any one or any combination of a modem processor, or a baseband processor, or a digital signal processor, or a transmit processor, or a transceiver processor associated with transceiver 60, or a system-on-chip (SoC). In particular, the one or more processors 20 may execute functions and components included in the waveform generation module 305.

In one or more aspects, the waveform generation module 305 may be configured to modify the zero-tail DFT-spread OFDM waveform to match the numerology of other OFDM waveforms (e.g., OFDM waveform with zero-guard or a single carrier DFT-spread OFDM with zero-guard). In some aspects, an extended zero-tail DFT-spread OFDM waveform is generated by scaling a first type of DFT-spread OFDM waveform (e.g., zero-tail DFT-spread OFDM waveform) to increase a number of tail zero bits attached to a data sequence, and subsequently truncate the increased number of tail zero bits in the first type DFT-spread such that a size of the first type of DFT-spread OFDM waveform matches a size of a second type of DFT-spread OFDM waveform. In another aspect, the waveform generation module 305 may be configured to select whether to generate zero-tail DFT-spread OFDM waveforms or extended zero-tail DFT-spread OFDM waveform based on an indication provided by a base station.

In some examples, the waveform generation module 305 and each of the sub-components may comprise hardware, firmware, and/or software and may be configured to execute code or perform instructions stored in a memory (e.g., a computer-readable storage medium). Moreover, in an aspect, UE 115 may include RF front end 61 and transceiver 60 for receiving and transmitting radio transmissions, for example, via communication link 125. For example, transceiver 60 may receive a packet transmitted by the base station 105. UE 115, upon receipt of an entire message, may decode the message and perform a cyclic redundancy check (CRC) to determine whether the packet was received correctly. For example, transceiver 60 may communicate with modem 108 to transmit messages generated by waveform generation module 305 and to receive messages and forward them to waveform generation module 305.

RF front end 61 may be connected to one or more antennas 64 and can include one or more switches 59, one or more amplifiers (e.g., power amplifiers (PAs) 64 and/or low-noise amplifiers 66), and one or more filters 67 for transmitting and receiving RF signals on the uplink channels and downlink channels. In an aspect, components of RF front end 61 can connect with transceiver 60. Transceiver 60 may connect to one or more modems 108 and processor 20.

Transceiver 60 may be configured to transmit (e.g., via transmitter radio 62) and receive (e.g., via receiver radio 63) and wireless signals through antennas 64 via RF front end 61. In an aspect, transceiver may be tuned to operate at specified frequencies such that UE 115 can communicate with, for example, base station 105. In an aspect, for example, modem 108 can configure the transceiver 60 to operate at a specified frequency and power level based on the UE configuration of the UE 115 and communication protocol used by modem.

UE 115 may further include a memory 44, such as for storing data used herein and/or local versions of applications or waveform generation module 305 and/or one or more of its subcomponents being executed by processor 20. Memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, memory 44 may be a computer-readable storage medium that stores one or more computer-executable codes defining waveform generation module 305 and/or one or more of its subcomponents. Additionally or alternatively, the UE 115 may include a bus 11 for coupling the RF front end 61, transceiver 60, memory 44 and processor 20 and to exchange signaling information between each of the components and/or subcomponents of the UE 115. Although FIG. 3A illustrates the UE 115 as the transmitting device having a waveform generation module 305, it should be understood by those of ordinary skill in the art that the base station 105 may also operate as the transmitter in accordance with various aspects of the present disclosure. In such instance, the UE 115 may operate as the receiver (subcomponents illustrated in FIG. 4A).

Figure 3B:
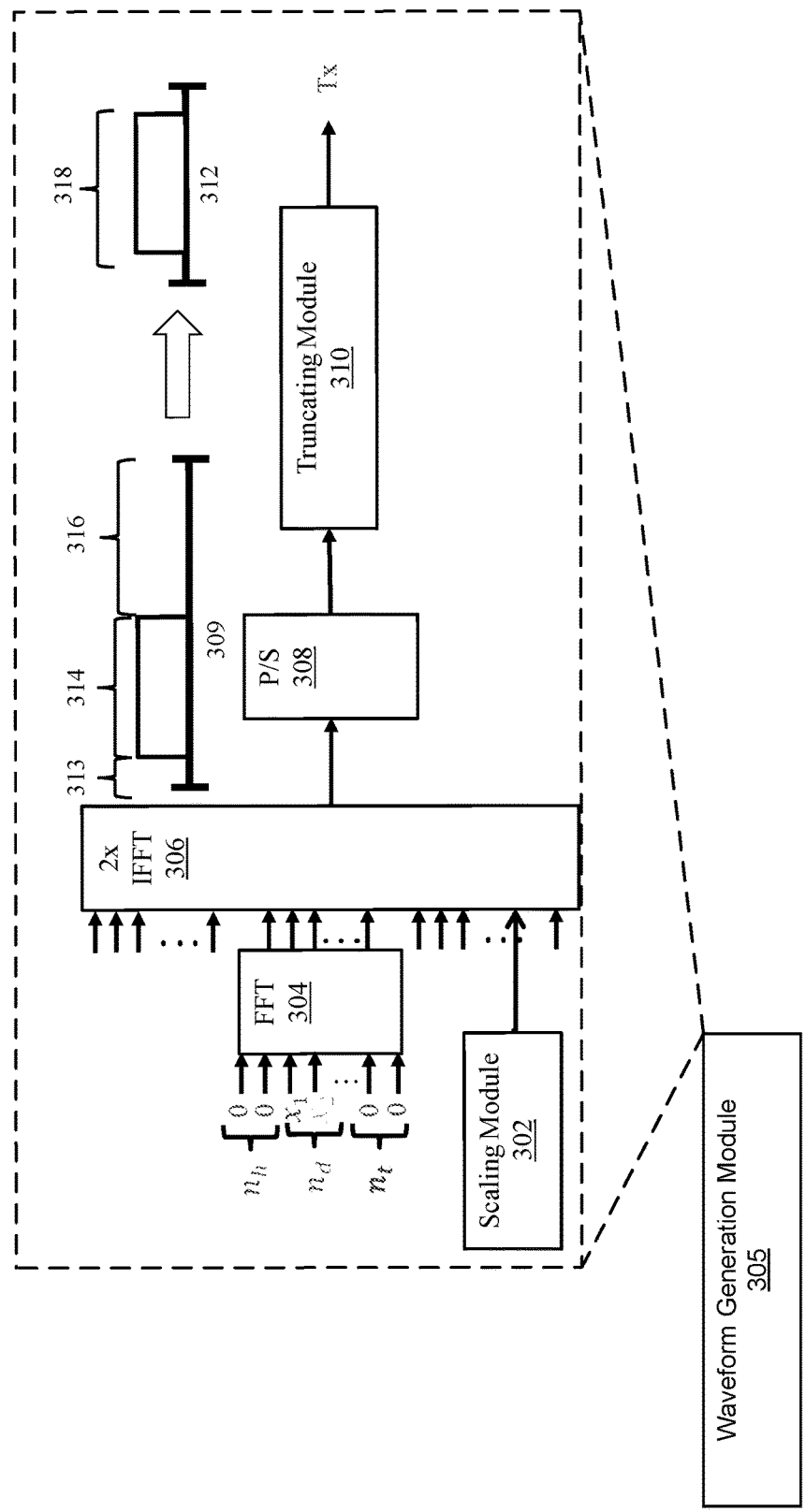
FIG. 3B illustrates an example of extended zero-tail DFT-spread OFDM waveform generation for wireless communications in accordance with various aspects of the present disclosure.

FIG. 3B illustrates one example of a waveform generation module 305 implemented in one or more UEs 115 in accordance with various aspects of the present disclosure. In some aspects, the waveform generation module 305 may be configured to transmit one or both of a first type of DFT-spread OFDM waveform (e.g., zero-tail DFT-spread OFDM waveform) or a second type of DFT-spread OFDM waveform (e.g., OFDM waveform with zero-guard or a single carrier DFT-spread OFDM with zero-guard) over the wireless channel.

In some aspects, the waveform generation module 305 may achieve the above advantage by scaling the first type of DFT-spread OFDM waveform to increase the number of tail zero bits attached to the data sequence by applying a fast fourier transform (FFT) 304 and a first type inverse fast fourier transform (IFFT) 306. In some aspects, the input of the FFT 304 may include a number of header zeros bits ($n_h$), a number of data bits ($n_d$), and a number of tail zero bits ($n_t$). The size of the FFT 304 may be determined based on the amount of frequency resources allocated to the transmitting device 301. In one or more examples, the FFT 304 may convert the data sequence from a time domain into the frequency domain. In one or more examples, the output of the FFT 304 may be sent to the IFFT 306. In some examples, the first type IFFT 306 may have a size that is two times the size of a second type IFFT generally used to exclusively process the second type of DFT-spread OFDM waveforms.

Accordingly, in one or more examples, the scaling module 302 may increase a number of tail zero bits ($n_t$) attached to a data sequence. In some examples, aspects of the present disclosure may apply the IFFT 306 to the data sequence to convert the data sequence from frequency domain back to the time domain before applying a parallel-to-serial converter 308. In one or more examples, increasing the number of tail zero bits ($n_t$) attached to a data sequence and applying the IFFT 306 to the data sequence may produce a signal 309. The signal 309 may include a header portion 313, a data sequence portion 314, and the tail portion 315. In one or more examples, the size of the header portion 313 may be determined based on equation (1):

$$\frac{n_h \times (2 \times FFT \text{ Size})}{n_h + n_d + n_t} \qquad \text{Equation (1)}$$

The size of the data sequence portion 314 may be determined based on equation (2):

$$\frac{n_d \times (2 \times FFT \text{ Size})}{n_h + n_d + n_t} \qquad \text{Equation (2)}$$

The size of the tail portion 315 may be determined based on equation (3):

$$\frac{n_t \times (2 \times FFT \text{ Size})}{n_h + n_d + n_t} \qquad \text{Equation (3)}$$

In further aspects of the present disclosure, a truncating module 310 may be configured to truncate the increased number of tail zero bits in the first type DFT-spread such that a size of the first type of DFT-spread OFDM waveform matches a size of a second type of DFT-spread OFDM waveform. For example, the truncating module 310 may truncate the size of the signal 309 to the first type of DFT-spread OFDM waveform 312 where the size 318 of the first type of DFT-spread OFDM waveform may be equal to FFT size+Zero guard length. In some aspects, the term "truncate" may mean reducing or shortening a number of bits to a predetermined number of bits. Subsequently, the transmitter may transmit the first type of DFT-spread OFDM waveform 312 having the increased number of tail zero bits truncated over the wireless channel to a receiver.

Figure 3C:
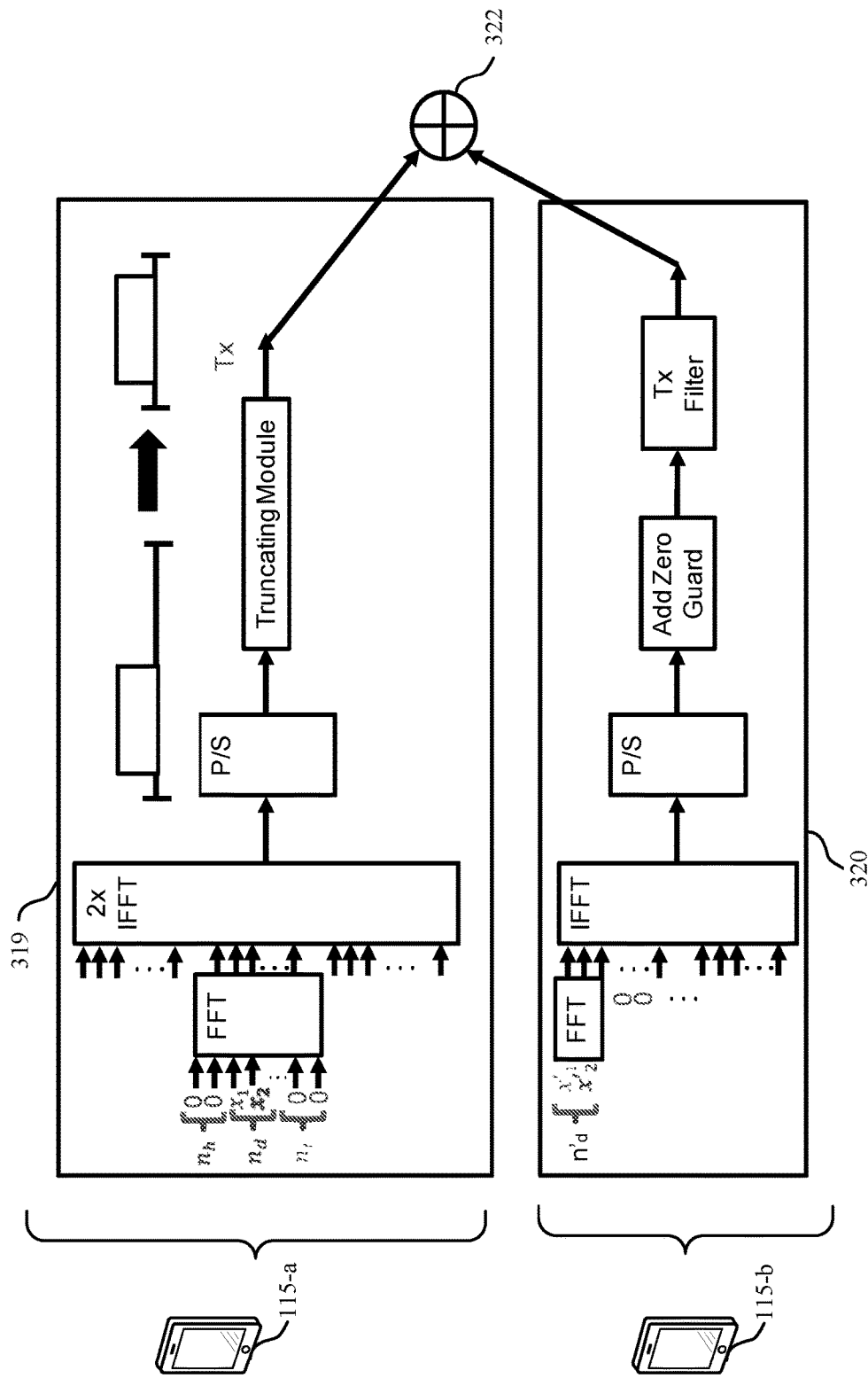
FIG. 3C illustrates an example of OFDM waveform multiplexing over wireless communications in accordance with various aspects of the present disclosure.

In one or more examples, transmitting the first type of DFT-spread OFDM waveform having the increased number of tail zero bits truncated may comprise multiplexing the first type of DFT-spread OFDM waveform transmitted from a first UE and the second type of DFT-spread OFDM waveform transmitted from a second UE over a wireless channel. Such feature is described in FIG. 3C that illustrates a system having a plurality of UEs 115. In accordance with various aspects of the present disclosure, one or more first UEs (e.g., UE 115-$a$), in an uplink transmission, may utilize a first type of DFT-spread OFDM waveform 319 generated by the waveform generation module 305 over a first set of frequency resources, while one or more second UEs (e.g., UE 115-$b$), may utilize a second type of DFT-spread OFDM waveform 320 for transmission over a second set of frequency resources. As discussed above, the second type of DFT-spread OFDM waveform 320 may include OFDM waveform with zero-guard and/or Single Carrier DFT-spread OFDM with zero-guard. As such, in some aspects, the first type of DFT-spread OFDM waveform 319 and the second type of DFT-spread OFDM waveform 320 may be multiplexed 322 over the wireless channel.

Figure 4A:
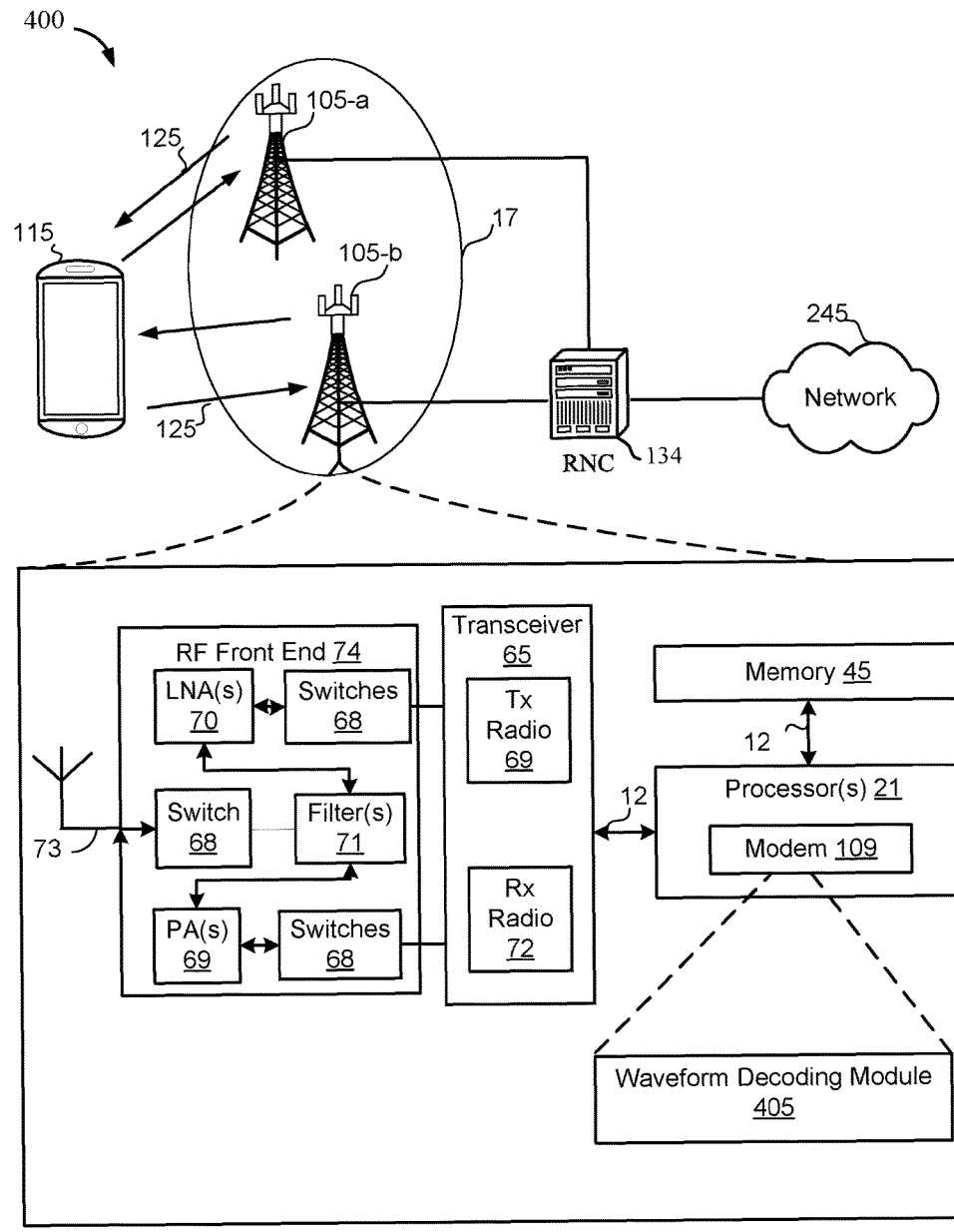
FIG. 4A is a schematic diagram of a base station that may implement a decoder in accordance with various aspects of the present disclosure.

Referring to FIG. 4A, in an aspect, a wireless communication system 400 includes at least one UE 115 in communication coverage of at least one base station 105. In some examples, the UE 115 and/or the base station 105 may be an example of UE 115 and base station 105 described with reference to FIGS. 1A and 2.

In an aspect, the base station 105 may include one or more processors 21 that may operate in combination with waveform decoding module 405 to decode different types of signals without a need for distinct hardware structures. The one or more processors 21 may include a modem 109 that uses one or more modem processors. The various functions related to the waveform decoding module 405 may be included in modem 109 and/or processors 21 and, in an aspect, can be executed by a single processor, while in other aspects, different ones of the functions may be executed by a combination of two or more different processors. For example, in an aspect, the one or more processors 21 may include any one or any combination of a modem processor, or a baseband processor, or a digital signal processor, or a transmit processor, or a transceiver processor associated with transceiver 65, or a system-on-chip (SoC). In particular, the one or more processors 21 may execute functions and components included in the waveform decoding module 405.

In one or more aspects, the waveform decoding module 405 may be configured to process a multiplexed signal that comprises both the first type of DFT-spread OFDM waveform and the second type of DFT-spread OFDM waveform. In some examples, the waveform decoding module 405 may receive a first type of DFT-spread OFDM waveform (e.g., zero-tail DFT-spread OFDM waveform) having a same size as a second type of DFT-spread OFDM waveform (e.g., OFDM waveform with zero-guard or a single carrier DFT-spread OFDM with zero-guard), and increase a number of tail zero bits on the first type of DFT-spread OFDM waveform to generate an extended zero-tail DFT-spread OFDM waveform. Upon increasing the number of tail zero bits, the waveform decoding module 405 may scale the first type of DFT-spread OFDM waveform having the increased number of tail zero bits to obtain a data sequence attached to the tail zero bits.

In some examples, the waveform decoding module 405 and each of the sub-components may comprise hardware, firmware, and/or software and may be configured to execute code or perform instructions stored in a memory (e.g., a computer-readable storage medium). Moreover, in an aspect, the base station 105 may also include RF front end 74 and transceiver 65 for receiving and transmitting radio transmissions, for example, via communication links 125. For example, transceiver 65 may receive a packet transmitted by the UE 115. The base station 105, upon receipt of an entire message, may decode the message and perform a cyclic redundancy check (CRC) to determine whether the packet was received correctly. For example, transceiver 65 may communicate with modem 109 to transmit messages generated by waveform decoding module 405 and to receive messages and forward them to waveform decoding module 405.

RF front end 74 may be connected to one or more antennas 73 and can include one or more switches 68, one or more amplifiers (e.g., power amplifiers (PAs) 69 and/or low-noise amplifiers 70), and one or more filters 71 for transmitting and receiving RF signals on the uplink channels and downlink channels. In an aspect, components of RF front end 74 can connect with transceiver 65. Transceiver 65 may connect to one or more modems 109 and processors 21.

Transceiver 65 may be configured to transmit (e.g., via transmitter radio 69) and receive (e.g., via receiver radio 72) and wireless signals through antennas 73 via RF front end 74. In an aspect, transceiver may be tuned to operate at specified frequencies such that base station 105 can communicate with, for example, UE 115. In an aspect, for example, modem 109 can configure the transceiver 65 to operate at a specified frequency and power level based on the base station configuration of the base station 105 and communication protocol used by modem.

The base station 105 may further include a memory 45, such as for storing data used herein and/or local versions of applications or waveform decoding module 405 and/or one or more of its subcomponents being executed by processor 20. Memory 45 can include any type of computer-readable medium usable by a computer or processors 21, such as random access memory (RAM), read only memory (ROM), tapes, magnetic discs, optical discs, volatile memory, non-volatile memory, and any combination thereof. In an aspect, for example, memory 45 may be a computer-readable storage medium that stores one or more computer-executable codes defining waveform decoding module 405 and/or one or more of its subcomponents. Additionally or alternatively, the base station 105 may include a bus 12 for coupling the RF front end 74, transceiver 65, memory 45 and processor(s)

21 and to exchange signaling information between each of the components and/or subcomponents of the base station 105. Although FIG. 4A illustrates the base station 105 as the receiving device having a waveform decoding module 405, it should be understood by those of ordinary skill in the art that, in some aspects, the UE 115 may also operate as the receiver device in accordance with various aspects of the present disclosure. In such instance, the base station 105 may operate as the transmitter having the waveform generation module 305 (subcomponents illustrated in FIG. 3A).

Figure 4B:
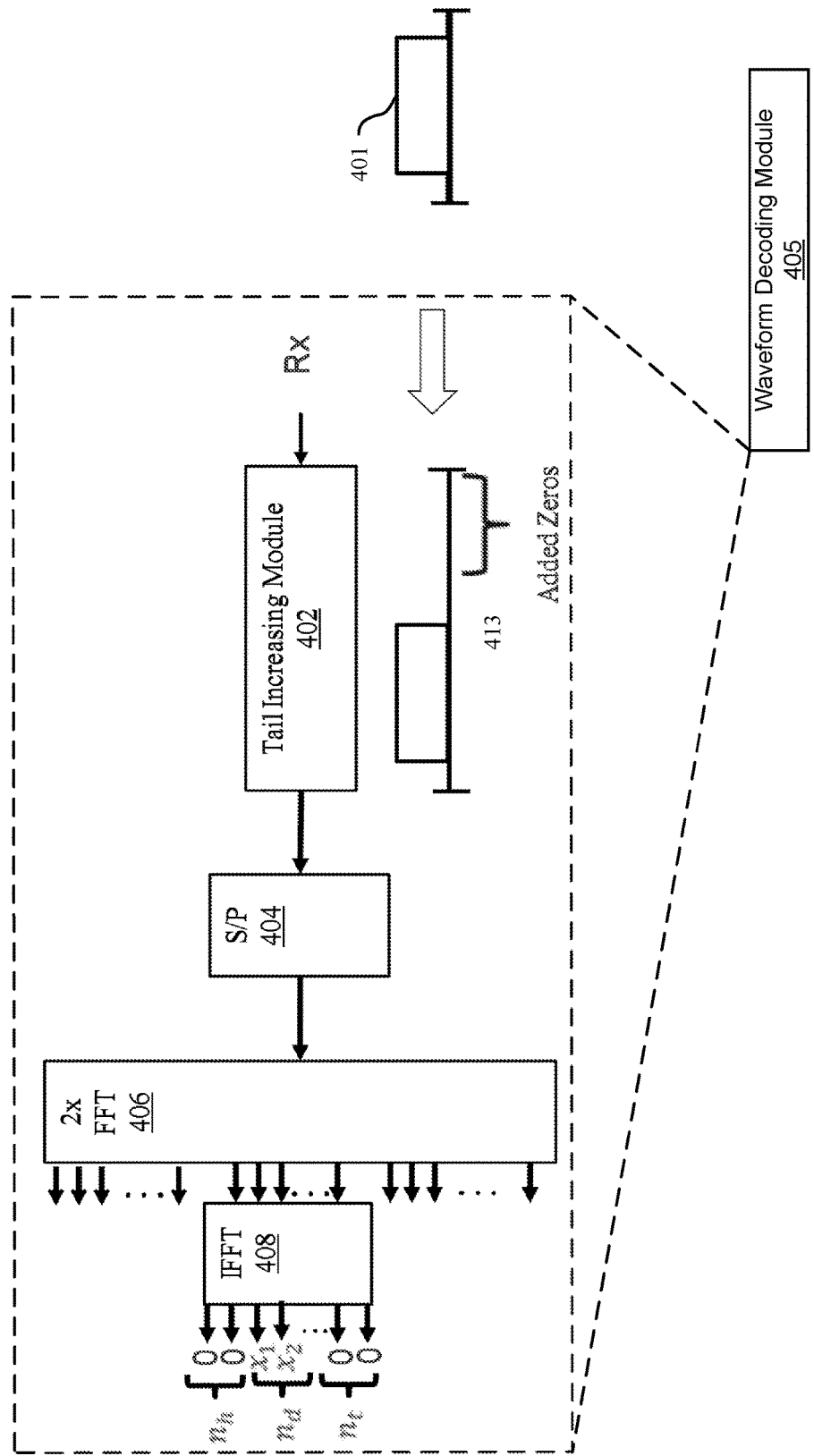
FIG. 4B illustrates one example of OFDM waveform decoding in wireless communications in accordance with various aspects of the present disclosure.

FIG. 4B illustrates one example of waveform decoding module 405 receiving and decoding the multiplexed signal 401. It should be noted that FIG. 4B only illustrates a part of the multiplexed signal. In some aspects, receiving the multiplexed signal 401 may comprise receiving a first type of DFT-spread OFDM waveform (e.g., zero-tail DFT-spread OFDM waveform) having a same size as a second type of DFT-spread OFDM waveform (e.g., OFDM waveform with zero-guard or a single carrier DFT-spread OFDM with zero-guard).

In some examples, the waveform decoding module 405 may include a tail increasing module 402 for increasing a number of tail zero bits 413 on the first type of DFT-spread OFDM waveform. The first type of DFT-spread OFDM waveform with increased tail zero bits 413 may be forwarded to serial-to-parallel converter 404 for converting the serial DFT-spread OFDM waveform into a parallel bit sequence. In some aspects, the waveform decoding module 405 may further include scaling the first type of DFT-spread OFDM waveform having the increased number of tail zero bits to obtain a data sequence ($n_d$) attached to the tail zero bits. Scaling the first type of DFT-spread OFDM waveform having the increased number of tail zero bits to obtain the data sequence attached to the tail zero bits may comprise applying a FFT 406 and an IFFT 408 to the received DFT-spread OFDM waveform. In some examples, the FFT 406 may have the same size as the IFFT 306 (e.g., the Tx IFFT 306 and Rx FFT 406 size may be the same). As discussed above, the FFT 406 may be shared by a waveform decoding module 405 to decode both the first type of DFT-spread OFDM waveform and the second type of DFT-spread OFDM.

For instance, the waveform decoding module 405, utilizing the FFT 406 and the IFFT 408, may decode the multiplexed signal 401 to extract the data sequence from the multiplexed signal by identifying corresponding symbol tones for the first type of discrete DFT-spread OFDM waveform or the second type of DFT-spread OFDM waveform. In some aspects, extracting the data sequence from the multiplexed signal by identifying corresponding symbol tones for the first type of discrete DFT-spread OFDM waveform may comprise taking the middle data part ($n_d$) of the output of the IFFT 408. Conversely, extracting the data sequence from the multiplexed signal by identifying corresponding symbol tones for the second type of discrete DFT-spread OFDM waveform may comprise extracting only the even tones of the FFT 406 output.

Thus, in some examples, the waveform decoding module 405 may apply the IFFT 408 to a first output of the FFT 406 corresponding to the first type of DFT-spread OFDM waveform to identify a first symbol tones, and apply the IFFT 408 to a second output of the FFT 406 corresponding to the second type of DFT-spread OFDM waveform to identify a second symbol tones, wherein the second output is different from the first output. As such, a single receiver module (e.g., base station 105) may be adapted to decode both the first type of discrete DFT-spread OFDM waveform and the second type of discrete DFT-spread OFDM waveform without relying on multiple decoders (e.g., first decoder 104, second decoder 106, and third decoder 107 in FIG. 1A).

Figure 4C:
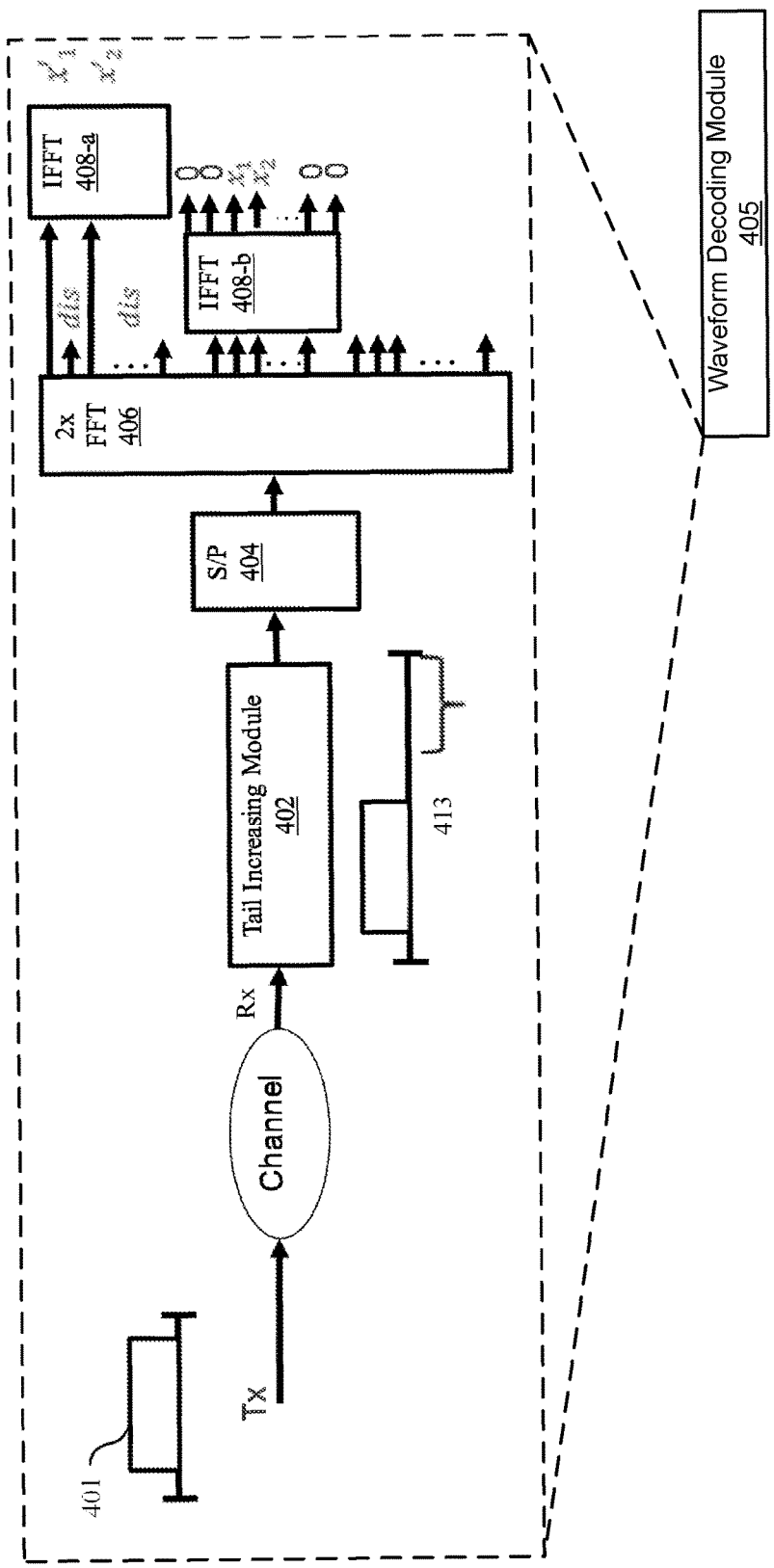
FIG. 4C illustrates another example of OFDM waveform decoding in wireless communications in accordance with various aspects of the present disclosure.

FIG. 4C illustrates yet another example of waveform decoding module 405 receiving and decoding the multiplexed signal 401. In this case, the waveform decoding module 405 may employ multiple IFFT(s) 408 to decode both the first type of DFT-spread OFDM waveform and the second type of DFT-spread OFDM. For example, IFFT 408-$b$ may be used to cancel the FFT of the first type of DFT-spread OFDM waveform 319, and the IFFT 408-$a$ may be used to cancel the FFT of the second type of DFT-spread OFDM waveform 320.

In some aspects, the waveform decoding module 405, utilizing the FFT 406 and the IFFT 408-$a$ and IFFT 408-$b$, may decode the multiplexed signal 401 to extract the data sequence from the multiplexed signal by identifying corresponding symbol tones for the first type of discrete DFT-spread OFDM waveform or the second type of DFT-spread OFDM waveform. In some aspects, extracting the data sequence from the multiplexed signal by identifying corresponding symbol tones for the first type of discrete DFT-spread OFDM waveform may comprise taking the middle data part ($n_d$) of the output of the IFFT 408-$b$. In some aspects, the size of the IFFT 408-$b$ may equal the length of header zeros ($n_h$), data portion ($n_d$), and the tail zeros ($n_t$). In some aspects, extracting the data sequence from the multiplexed signal by identifying corresponding symbol tones for the second type of discrete DFT-spread OFDM waveform may comprise doubling the tone indexes used in transmitter IFFT 306 (see FIG. 3B). In yet further examples, the waveform decoding module 405 may also utilize IFFT 408-$a$ to extract the data sequence from the multiplexed signal. In such instance, the IFFT 408-$a$ size may be equal to $n_d$.

Thus, in some examples, the waveform decoding module 405 may apply the IFFT 408-$a$ and/or IFFT 408-$b$ to a first output of the FFT 406 corresponding to the first type of DFT-spread OFDM waveform to identify a first symbol tones, and apply the IFFT 408-$a$(and -$b$) to a second output of the FFT 406 corresponding to the second type of DFT-spread OFDM waveform to identify a second symbol tones, wherein the second output is different from the first output. Thus, in accordance with various aspects of the present disclosure, applying an FFT may include transforming a signal from a first domain (e.g., time or space) to a second domain (e.g., frequency domain). Conversely the IFFT may include transforming a respective signal from the second domain (e.g., frequency domain) to the first domain (e.g., time domain).

As such, a single receiver module (e.g., base station 105) may be adapted to decode both the first type of discrete DFT-spread OFDM waveform and the second type of discrete DFT-spread OFDM waveform.

Figure 5:
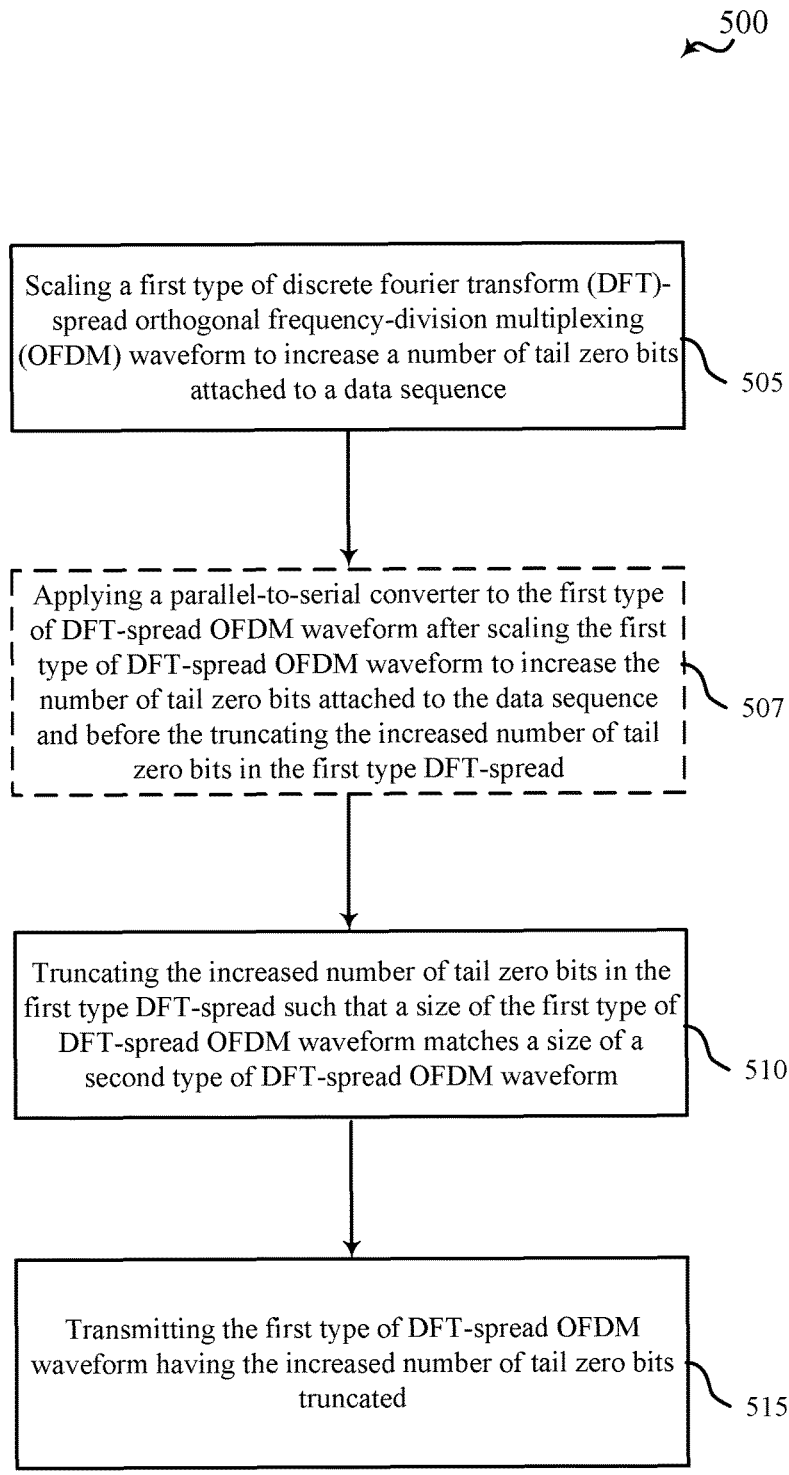
FIG. 5 illustrates an example of a flowchart in accordance with various aspects of the present disclosure.

FIG. 5 is a flowchart conceptually illustrating an example of a method 500 of wireless communication, in accordance with aspects of the present disclosure. For clarity, the method 500 may be performed by either a UE 115 or a base station 105, described with reference to FIGS. 1A, 2, and 3A-3C.

At block 505, the method 500 may include scaling a first type of DFT-spread OFDM waveform to increase a number of tail zero bits attached to a data sequence. In some aspects, scaling the first type of DFT-spread OFDM waveform to increase the number of tail zero bits attached to the data sequence may comprise applying a fast fourier transform (FFT) and a first type inverse fast fourier transform (IFFT).

In some examples, the first type IFFT may have a size that is two times a size of a second type IFFT. In other words, the size of the first type IFFT may be set to be twice the size of the IFFT that may be utilized to process a second type of DFT-Spread OFDM waveform Additionally or alternatively, the size of the FFT (e.g., for processing the first type of DFT-spread OFDM waveform) may be determined based on the amount of frequency resources allocated to the transmitting device (e.g., UE or base station). Aspects of block 505 may be performed by scaling module 302, FFT 304, and/or IFFT 306 described with reference to FIG. 3A.

At block 507, the method 500 may optionally include applying a parallel-to-serial converter to the first type of DFT-spread OFDM waveform after scaling the first type of DFT-spread OFDM waveform to increase the number of tail zero bits attached to the data sequence and before the truncating the increased number of tail zero bits in the first type DFT-spread. Although a parallel-to-serial converter is disclosed, it is contemplated that any structure, device, or component that is configured to serialize the OFDM waveform may be used to serialize the bits of an OFDM waveform in accordance with aspects of the present disclosure. Aspects of block 507 may be performed by parallel-to-serial converter 308 described with reference to FIG. 3B.

At block 510, the method 500 may include truncating the increased number of tail zero bits in the first type DFT-spread such that a size of the first type of DFT-spread OFDM waveform matches a size of a second type of DFT-spread OFDM waveform. Aspects of block 510 may be performed by truncating module 310 described with reference to FIG. 3A.

At block 515, the method 500 may include transmitting the first type of DFT-spread OFDM waveform having the increased number of tail zero bits truncated. Aspects of block 515 may be performed by transceiver 60 described with reference to FIG. 2.

Figure 6:
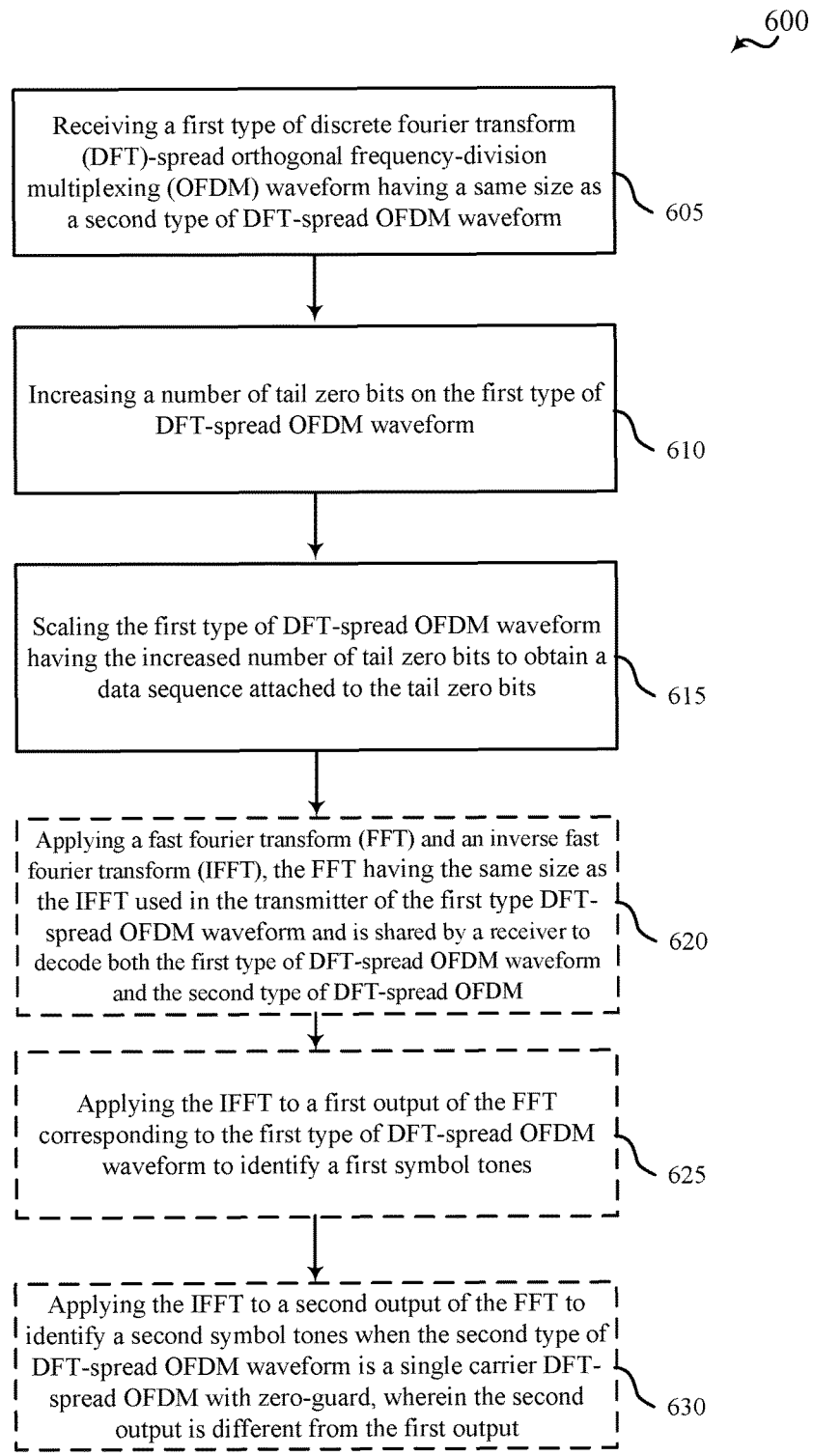
FIG. 6 illustrates another example of a flowchart in accordance with various aspects of the present disclosure.

FIG. 6 is a flowchart conceptually illustrating an example of a method 600 of wireless communication, in accordance with aspects of the present disclosure. For clarity, the method 600 may be performed by either a UE 115 or a base station 105, described with reference to FIGS. 1A, 2, and 4A-4C.

At block 605, the method 600 may include receiving a first type of DFT-spread OFDM waveform having a same size as a second type of DFT-spread OFDM waveform. Aspects of block 605 may be performed by transceiver 60 described with reference to FIG. 2.

At block 610, the method 600 may include increasing a number of tail zero bits on the first type of DFT-spread OFDM waveform. Aspects of block 610 may be performed by tail increasing module 402 described with reference to FIG. 4B and FIG. 4C.

At block 615, the method 600 may include scaling the first type of DFT-spread OFDM waveform having the increased number of tail zero bits to obtain a data sequence attached to the tail zero bits. Aspects of block 615 may be performed by IFFT 408 and/or the FFT 406 described with reference to FIG. 4B and FIG. 4C.

At block 620, the method 600 may optionally include applying a fast fourier transform (FFT) and an inverse fast fourier transform (IFFT), the FFT having the same size as the IFFT used in the transmitter of the first type DFT-spread OFDM waveform and is shared by a receiver to decode both the first type of DFT-spread OFDM waveform and the second type of DFT-spread OFDM. Aspects of block 620 may be performed by IFFT 408 and/or the FFT 406 described with reference to FIG. 4B and FIG. 4C.

At block 625, the method 600 may optionally include applying the IFFT to a first output of the FFT corresponding to the first type of DFT-spread OFDM waveform to identify a first symbol tones. Aspects of block 625 may be performed by IFFT 408-b described with reference to FIG. 4C.

At block 630, the method 600 may optionally include applying the IFFT to a second output of the FFT to identify a second symbol tones when the second type of DFT-spread OFDM waveform is a single carrier DFT-spread OFDM with zero-guard, wherein the second output is different from the first output. In some aspects, the second output may be different from the first output. Alternatively, if the second type of DFT-spread OFDM waveform is an OFDM with zero-guard, the method 600 may include identifying a symbol tones corresponding to the second type of DFT-spread OFDM waveform from output of the FFT. Aspects of block 630 may be performed by IFFT 408-a described with reference to FIG. 4C.

Further one or more methods described above may be performed by an apparatus (e.g., UE or base station) based on the corresponding structure (e.g., FIGS. 3A, 3B, 3C, 4A, 4B, and 4C) that includes means for scaling a first type of discrete fourier transform (DFT)-spread orthogonal frequency-division multiplexing (OFDM) waveform to increase a number of tail zero bits attached to a data sequence. The apparatus may also include means for truncating the increased number of tail zero bits in the first type DFT-spread such that a size of the first type of DFT-spread OFDM waveform matches a size of a second type of DFT-spread OFDM waveform. In some aspects, the apparatus may further include means for transmitting the first type of DFT-spread OFDM waveform having the increased number of tail zero bits truncated.

With respect to the receiver (e.g., UE or base station), the apparatus may include means for receiving a first type of discrete fourier transform (DFT)-spread orthogonal frequency-division multiplexing (OFDM) waveform having a same size as a second type of DFT-spread OFDM waveform. The apparatus may further include means for increasing a number of tail zero bits on the first type of DFT-spread OFDM waveform, and means for scaling the first type of DFT-spread OFDM waveform having the increased number of tail zero bits to obtain a data sequence attached to the tail zero bits.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile Communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communications, comprising:
receiving a first type of discrete fourier transform (DFT)-spread orthogonal frequency-division multiplexing (OFDM) waveform having a same size as a second type of DFT-spread OFDM waveform;
increasing a number of tail zero bits on the first type of DFT-spread OFDM waveform;
scaling the first type of DFT-spread OFDM waveform having the increased number of tail zero bits to obtain a data sequence attached to the tail zero bits;
applying a fast fourier transform (FFT) and an inverse fast fourier transform (IFFT), the FFT having the same size as the IFFT used in the transmitter of the first type DFT-spread OFDM waveform and is shared by a receiver to decode both the first type of DFT-spread OFDM waveform and the second type of DFT-spread OFDM;
applying the IFFT to a first output of the FFT corresponding to the first type of DFT-spread OFDM waveform to identify a first symbol tones; and
applying the IFFT to a second output of the FFT to identify a second symbol tones when the second type of DFT-spread OFDM waveform is a single carrier DFT-spread OFDM with zero-guard, wherein the second output is different from the first output.

2. The method of claim 1, wherein receiving the first type of discrete DFT-spread OFDM waveform having the same size as the second type of DFT-spread OFDM waveform comprises:
receiving a multiplexed signal that comprises both the first type of DFT-spread OFDM waveform and the second type of DFT-spread OFDM waveform.

3. The method of claim 1, further comprising:
decoding the multiplexed signal to extract the data sequence from the multiplexed signal by identifying corresponding symbol tones for the first type of DFT-spread OFDM waveform or the second type of DFT-spread OFDM waveform.

4. The method of claim 1, wherein the first type of DFT-spread OFDM waveform is a zero-tail DFT-spread OFDM waveform and the second type of DFT-spread OFDM waveform is one of an OFDM waveform with zero-guard or a single carrier DFT-spread OFDM with zero-guard.

5. The method of claim 1, further comprising:
identifying a symbol tones corresponding to the second type of DFT-spread OFDM waveform from output of the FFT when the second type of DFT-spread OFDM waveform is an OFDM with zero-guard.

6. The method of claim 1, further comprising:
applying a serial-to-parallel converter to the first type of DFT-spread OFDM waveform after increasing the number of tail zero bits on the first type of DFT-spread OFDM waveform and before scaling the first type of DFT-spread OFDM waveform having the increased number of tail zero bits to obtain the data sequence attached to the tail zero bits.

7. An apparatus for wireless communications, comprising:
a transceiver;
a memory configured to store instructions; and
a processor communicatively coupled to the transceiver and the memory, the processor configured to execute the instructions to:
receive, via the transceiver, a first type of discrete fourier transform (DFT)-spread orthogonal frequency-division multiplexing (OFDM) waveform having a same size as a second type of DFT-spread OFDM waveform;
increase a number of tail zero bits on the first type of DFT-spread OFDM waveform;
scale the first type of DFT-spread OFDM waveform having the increased number of tail zero bits to obtain a data sequence attached to the tail zero bits;
apply a fast fourier transform (FFT) and an inverse fast fourier transform (IFFT), the FFT having the same size as the IFFT used in the transmitter of the first type DFT-spread OFDM waveform and is shared by a receiver to decode both the first type of DFT-spread OFDM waveform and the second type of DFT-spread OFDM;
apply the IFFT to a first output of the FFT corresponding to the first type of DFT-spread OFDM waveform to identify a first symbol tones; and
apply the IFFT to a second output of the FFT to identify a second symbol tones when the second type of DFT-spread OFDM waveform is a single carrier DFT-spread OFDM with zero-guard, wherein the second output is different from the first output.

8. The apparatus of claim 7, wherein the processor configured to receive the first type of discrete DFT-spread OFDM waveform having the same size as the second type of DFT-spread OFDM waveform is further configured to:
receive a multiplexed signal that comprises both the first type of DFT-spread OFDM waveform and the second type of DFT-spread OFDM waveform.

9. The apparatus of claim 7, wherein the processor is further configured to:
decode the multiplexed signal to extract the data sequence from the multiplexed signal by identifying corresponding symbol tones for the first type of DFT-spread OFDM waveform or the second type of DFT-spread OFDM waveform.

10. The apparatus of claim 7, wherein the first type of DFT-spread OFDM waveform is a zero-tail DFT-spread OFDM waveform and the second type of DFT-spread OFDM waveform is one of an OFDM waveform with zero-guard or a single carrier DFT-spread OFDM with zero-guard.

11. The apparatus of claim 7, wherein the processor is further configured to:
identify a symbol tones corresponding to the second type of DFT-spread OFDM waveform from output of the FFT when the second type of DFT-spread OFDM waveform is an OFDM with zero-guard.

12. The apparatus of claim 7, wherein the processor is further configured to:
apply a serial-to-parallel converter to the first type of DFT-spread OFDM waveform after increasing the number of tail zero bits on the first type of DFT-spread OFDM waveform and before scaling the first type of DFT-spread OFDM waveform having the increased number of tail zero bits to obtain the data sequence attached to the tail zero bits.

* * * * *